ary—William C. Nealon, Noble S. Williams and Robert
J. Bird

United States Patent
Young

[15] 3,675,152
[45] July 4, 1972

[54] COMPENSATOR FOR A RADIAL REFRACTIVE-INDEX GRADIENT IN A DISC LASER

[72] Inventor: Charles Gilbert Young, Storrs, Conn.
[73] Assignee: American Optical Corporation, Southbridge, Mass.
[22] Filed: June 24, 1970
[21] Appl. No.: 49,263

Related U.S. Application Data

[63] Continuation-in-part of Ser. No. 20,946, March 19, 1970, Pat. No. 3,602,836.

[52] U.S. Cl. .................................................. 331/94.5
[51] Int. Cl. ............................................... H01s 3/00
[58] Field of Search .................................... 331/94.5

[56] References Cited

UNITED STATES PATENTS

| | | | |
|---|---|---|---|
| 3,487,330 | 12/1969 | Gudmundsen | 331/94.5 |
| 3,423,696 | 1/1969 | Chernoch | 331/94.5 |
| 3,546,621 | 12/1970 | Stickley | 331/94.5 |
| 3,609,584 | 9/1971 | Stitch | 331/94.5 |

Primary Examiner—Ronald L. Wibert
Assistant Examiner—Conrad Clark
Attorney—William C. Nealon, Noble S. Williams and Robert J. Bird

[57] ABSTRACT

A disc laser structure of all-glass support construction. A segmented neodymium-doped glass laser rod is supported in a glass tubing and is designed to permit fluid coolant flow within the tubing and amongst the rod segments. The non-laserable glass supporting means consists of samarium-doped cladding glass to reduce interference by "off axis" spontaneously emitted light. The fluid coolant has an index of refraction which matches that of the laser glass to achieve a high efficiency. The absence of metallic supporting means minimizes the chance of metallic decomposition under the influence of pump light. Compensation for a radial refractive index gradient is provided by figuring (creating a non-zero optical power in) one or more of the glass discs.

12 Claims, 2 Drawing Figures

Patented July 4, 1972

3,675,152

INVENTOR.
CHARLES GILBERT YOUNG

BY Robert J Beil

ATTORNEY

COMPENSATOR FOR A RADIAL REFRACTIVE-INDEX GRADIENT IN A DISC LASER

CROSS REFERENCES TO RELATED APPLICATIONS

This application is related to my copending applications, "All Glass Rectangular Disc Laser," Ser. No. 20,946, filed Mar. 19, 1970 and "Laser Structure with a Segmented Laser Rod," Ser. No. 812,119,filed Apr. 1, 1969 which has matured into U.S. Pat No. 3,602,836. This patent application is a continuation-in-part of the above-identified copending application, Ser. No. 20,946filed Mar. 19, 1970.

BACKGROUND OF THE INVENTION

This invention relates to glass lasers and, more particularly, to an all-glass rectangular-disc laser incorporating refractive index gradient compensation in the radial direction.

A laser (light amplification by stimulated emission of radiation) is a well-known device consisting of a rod of lasering material between parallel end mirrors, one of which provides full reflection and the other partial reflection and partial transmission of light therethrough. Pump light is introduced into the laser material, generally normal to the longitudinal axis of the rod between the two end mirrors. The laser light energy is produced in the laser rod by photonic emission from active or high energy level ions in the body of the laser material, with the pump light increasing the number of ions from lower energy level to the upper energy level.

The pumping light energy abnormally increases the upper level population of ions and concomitantly depletes the lower level population of ions creating an inversion of energy states. Some of the ions in the upper energy level undergo a spontaneous light emissive transmission to the lower level, and a portion of the spontaneously emissive light reflects back and forth between the mirrored surfaces stimulating similar light emissive transmissions from other upper level ions. As the stimulated emission reflects back and forth repeatedly through the rod a sufficiently high intensive pulse of laser light energy is emitted for transmission through the partially reflective surface.

There are various problems associated with producing a laser beam. The amount of pumping illumination required to produce laser action in neodymium glass is about 50 watts per cubic centimeter. This pumping light produces heat in the lasering material, as does operation at high repetition rates. Special precautions must be taken for removing this heat. It is known in the art that temperature rises in the lasering materials of glass must be kept uniform to within about 1° C. or less in order for the Fabry-Perot cavity amplification to take place without loss of efficiency.

When operating solid glass laser rods at high repetition rates two problems appear. First, the rod may exhibit a planar radial split or break when the surface tangential stress exceeds the tensile limit of the glass. The second problem area is that of change in index of refraction with temperature, and in the case of a cylindrical glass laser rod a strong positive lens effect results under moderate average-power operating conditions.

For example, the changes in temperature in a nonsegmented laser rod cause an unequal index of refraction radially in the rod because of the linear expansion of the material. These temperature changes together with the change of index of refraction with temperature at constant density, and stress-induced birefringence, produce an effect in the rod which is deleterious. Other problems (and discussion thereof) in lasers are found in the applications, and the subject matter thereof is incorporated by reference.

As further background in this particular laser rod art I make reference to the segmented lasers of the type disclosed in my copending applications "Disc Laser Modification," Ser. No. 812,119 which has matured into U.S. Pat. No. 3,602,836 and "Disc Laser Variation," Ser. No. 809,641 which was filed on Mar. 24, 1969 and which has matured into U.S. Pat. 3,621,456 assigned to the same assignee as that of the present invention.

The disc laser approach, however, has been found to have some limitations. Since the laser light passes through a considerable length of the cooling fluid, this fluid must be transparent and remain so during prolonged operation. In addition, inter-facial optical losses between the fluid and the discs should be no more than for a solid rod. Also, appropriate mounting means must be employed which will not compromise laser efficiency, robustness, reliability, etc.

One of the problems involved with disc lasers, and which is solved in my copending application, Ser. No 20,946, is the efficiency loss resulting from support-metal decomposition under the influence of the pump light. Pump light, for example, from a Xenon flash tube, is intense energy. This light will oxidize the metal thereby contaminating the fluid coolant. The result of this is to decrease pumping efficiency, lasing efficiency, laser life, fluid transparency, and possibly cause blockage of coolant flow and other problems.

However, the present problem is the divergence or convergence of the laser beam due to a small but finite radial refractive-index gradient. This gradient is usually thermally induced and caused by absorption of the flashlamp heat by the glass discs or segmented rod. The present invention solves this problem.

Therefore, it is an object of the present invention to provide an improved disc-laser structure.

An additional object of the present invention is to provide a disc laser structure capable of compensating for the deleterious effects of radial refractive index gradients.

BRIEF DESCRIPTION OF THE INVENTION

My invention relates to means for compensating for a radial index of refraction gradient in a laser glass disc. The laser glass disc preferably is circumferentially encompassed by a cladding glass, the periphery of which is rectangularly shaped (but could have another cross-section). This assembly of the two types of glass is termed a "plate" hereafter.

The rectangular plates preferably are held within a glass tube of complementary cross-section. I prefer a rectangular cross-section. This tube is arranged to precisely align the plates along a common longitudinal axis. The plates have sufficient thickness to permit alignment by the tube and have apertures therethrough near edges of the plates. The plate orientation within the tube is such that adjacent plates have apertures in diagonally opposite corners to provide a coolant flow path across the surface of each plate. Thus coolant flow is along a tortuous and generally undulating path. The coolant fluid preferably is selected to have an index of refraction equal to that of the selected laser glass, for example, with neodymium-doped glass equal to 1.51 for optimum operation.

Flash tubes used to supply the pump light are approximately parallel to the outside wall of the rectangular glass tubing and therefore separated by the tubing wall thickness from the active laser medium. In like manner, a close-wrap coupling reflector is parallel to the outer wall of the tubing; two or four flash tubes may be arranged about the rectangular tube.

It is to be understood that other laser materials can be utilized, for example crystals such as ruby, YAG, etc., Laser glass of dopants other than neodymium and coated laser glass can be employed.

The optical correction for the small, but finite, residual thermal radial refractive index gradient forms the basis of the present invention. The major portion of the gradient appears as a single lens power. Hence the surface of a disc (or the surfaces of several discs) is ground (concave or convex depending on whether the deleterious lens effect is convergent or divergent) with the correct radius for the glass-fluid combination. Thus a correction (or a distributed correction) is applied and the disc laser is optical power free under repetitive operation. Hereafter, a lens which is ground or otherwise treated to obtain a desired power is termed a "figured" disc or plate.

DRAWINGS

FIG. 1 is a side elevation in partial section, partially broken away of the preferred embodiment of the present invention viewed perpendicularly to the longitudinal axis; and FIG. 2 is a cross-sectional view of the arrangement of FIG. 1 taken along the line 2—2.

DETAILED DESCRIPTION

Figure 1:
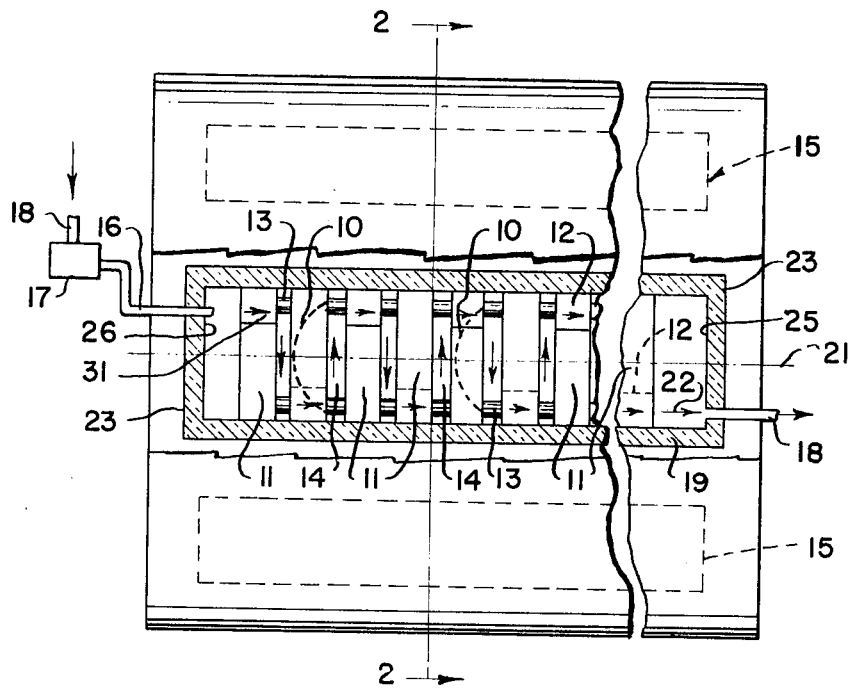

FIG. 1 depicts the preferred embodiment of my invention. Glass laser plates 10 and 11 are aligned along longitudinal axis 21 by rectangular glass tubing 19 into which plates 10 and 11 are inserted in a close tolerance fit. Glass spacers 13 are raised from the surfaces of plates 10 and 11 along a longitudinal direction. The spacers abut adjacent plates 10 or 11 and thereby provide a space for coolant flow 22 between plates. Coolant flow 22 is controlled by a pump 17. Flow enters segmented laser device 23 via orifice 16 and exits via orifice 18 back to pump 17. Details of the pump and associated cooling equipment are shown schematically herein to maintain drawing simplicity. More detailed information may be found in copending Booth application, Ser. No. 821,165 which was filed on Apr. 25, 1969 and which has matured into U.S. Pat. No. 3,569,860. The flow 22 within laser device 23 takes an undulating path through apertures 12 and speces 14, to provide efficient cooling of plates 10 and 11. The fluid is chosen to have an index of refraction of approximately 1.51 to match that of the preferred approximately 2.4 percent by weight $Nd^{+++}$ doped laser glass for maximum efficiency. For the samarium glass I prefer approximately 10 percent by weight dopant. For further information regarding the samarium and neodymium glasses useable according to this invention, I make reference to U.S. Pat. No. 3,445,785 to Koester et al. assigned to the same assignee as that of the present invention.

Flash tubes 15 are parallel to the outer wall of glass tubing 19 and although only two flash tubes are shown, more may be used. The flash tubes 15 provide the necessary excitation energy to the laserable material. The lasering action takes place in a direction parallel to longitudinal axis 21. The two ends of the laser rod contain parallel mirrored surfaces 25 and 26, both mirrors being orthogonal to the longitudinal axis; one surface is completely reflective and the other is partly reflective and partly transmissive to allow the exiting of the laser beam. As is well understood, the mirrors reflect light energy back and forth through the laser structure to promote light amplification.

Plates 10 contain circular discs that are figured according to my present invention, and correct for a radial index of refraction gradient whose effect is to converge the exciting laser beam (not shown). Plates 11 are not figured and have a zero optical power. Depending on the geometry and edge treatment of the plates 10 and 11, the thermally induced lens power may be positive, negative, or zero. Usually it is positive. Thus, the correction can be made negative, positive or zero, accordingly. Also, figuring of the plates 10 can include astigmatic corrections as well as spherical and aspherical figuring. The curvature of plates 10, shown as hidden curved lines, is exaggerated for purposes of illustrative clarity. It should be understood that any element (plate, disc, etc.) in the optical train including the end windows (not shown) can be figured according to the present invention.

In one specific example (not shown) a disc laser consists of 42 discs of 10 mm thickness spaced 1 mm apart and cooled on their broad faces by flowing heavy water. The discs have an 18 mm active laser glass right circular cylindric core inside a fused-on square parallelepipedal outer dimension inert glass cladding of 22 mm on an edge. When pumped by 6 kilowatts into four close-wrapped, water-cooled flashlamps, an increase in full-angle, half intensity beamspread of 10 milliradians was observed. According to the present invention, one or more of the disc surfaces are figured in a concave form to compensate for this thermally-induced lens power. The total optical power of the surface(s) is −0.56D (diopters) in this case for complete correction.

Figure 2:
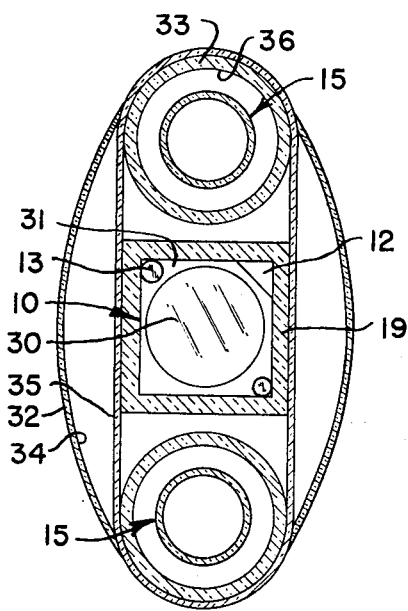

Laser disc 30, a figured disc, can be seen in FIG. 2 as a circle. The encompassing and supporting glass ring 31 is of samarium-doped glass. It absorbs any off-axis light rays which could interfere with the laser beam. An aperture 12 is formed through glass ring 31. Glass spacers 13 are shown in corners adjacent to the corner through which aperture 12 is formed. Water-cooled reflector 35 is provided which combined with wall 32 forms a conduit 34 for water coolant (not shown). Ultraviolet light absorbing glass flash tube water jacket 33 is provided which combines with the surface of the flash tube to form another conduit 36 for water coolant (not shown).

It is seen that glass support construction is used throughout. No metal parts are used internal to the glass tubing 19.

In FIG. 1, tubing 19 is shown separate and distinct from cladding glass ring 31. It should be understood that tubing 19 and ring 31 can both be of samarium-doped glass or can be formed as one continuous structure of samarium-doped glass.

From the embodiments of my invention disclosed herein, it is understood that other changes can be made without departing from the spirit and scope of the invention as defined by the appended claims.

What is claimed is:

1. In laser structure capable of emitting laser energy in the form of a beam, said laser structure including linear support means for supporting said structure and for containing tortuous flow of coolant fluid about a segmented laser rod, and optical pump means for exciting said rod, the improvement comprising a lens formed from substantially at least one entire surface of at least one of the segments of said rod having optical power sufficient to compensate for the optical influence of a thermally induced radial index of refraction gradient.

2. Laser structure as recited in claim 1 wherein said lens has a net negative-correction to compensate for said gradient causing divergence of said beam.

3. Laser structure as recited in claim 2 wherein said lens is one of said segments.

4. Laser structure as recited in claim 2 wherein said lens is a plurality of segments.

5. Laser structure as recited in claim 4 wherein each segment of said plurality of segments possesses optical power.

6. Laser structure as recited in claim 1 wherein said lens has a net positive-correction to compensate for said gradient causing convergence of said beam.

7. Laser structure as recited in claim 6 wherein said lens is formed of one of said segments.

8. Laser structure is recited in claim 6 wherein said lens is comprised of a plurality of said segments.

9. Laser structure as recited in claim 8 wherein each segment possesses optical power.

10. Laser structure as recited in claim 1 and wherein said lens has a spherical surface.

11. Laser structure as recited in claim 1 and wherein said lens has an aspherical surface.

12. Laser structure as recited in claim 1 and wherein said lens has a cylindrical surface.

* * * * *